US008095744B2

(12) United States Patent
Kawamoto et al.

(10) Patent No.: US 8,095,744 B2
(45) Date of Patent: Jan. 10, 2012

(54) DEVICE FOR CONTROLLING ACCESS FROM A PLURALITY OF MASTERS TO SHARED MEMORY COMPOSED OF A PLURALITY OF BANKS EACH HAVING A PLURALITY OF PAGES

(75) Inventors: Isao Kawamoto, Hyogo (JP); Yoshiharu Watanabe, Osaka (JP)

(73) Assignee: Panasonic Corporation, Osaka (JP)

(*) Notice: Subject to any disclaimer, the term of this patent is extended or adjusted under 35 U.S.C. 154(b) by 652 days.

(21) Appl. No.: 12/267,014

(22) Filed: Nov. 7, 2008

(65) Prior Publication Data
US 2009/0204771 A1 Aug. 13, 2009

(30) Foreign Application Priority Data

Feb. 12, 2008 (JP) ................................. 2008-030108

(51) Int. Cl.
*G06F 13/18* (2006.01)
*G06F 3/00* (2006.01)
*G06F 12/00* (2006.01)
*G06F 13/36* (2006.01)
*G06F 13/00* (2006.01)

(52) U.S. Cl. ............. 711/151; 345/535; 710/4; 710/244; 710/309; 711/158

(58) Field of Classification Search .................. 345/535; 710/40, 244, 309; 711/151, 158
See application file for complete search history.

(56) References Cited

U.S. PATENT DOCUMENTS

| 6,092,158 | A | 7/2000 | Harriman et al. |
| 6,591,323 | B2 | 7/2003 | Yu |
| 6,892,289 | B2 * | 5/2005 | Moss .............................. 711/167 |
| 7,213,084 | B2 * | 5/2007 | Ogilvie et ........................ 710/22 |
| 7,406,554 | B1 * | 7/2008 | Huffman ....................... 710/112 |
| 7,421,559 | B1 * | 9/2008 | Yadav ............................ 711/169 |
| 7,426,603 | B2 * | 9/2008 | Purcell et al. ...................... 711/5 |
| 7,617,368 | B2 * | 11/2009 | Van Dyke et al. ............. 711/156 |
| 7,694,040 | B2 * | 4/2010 | Yeh ................................. 710/41 |
| 7,697,362 | B2 * | 4/2010 | Lee et al. ................. 365/230.05 |
| 7,725,633 | B2 * | 5/2010 | Mochida et al. .............. 710/240 |
| 7,743,191 | B1 * | 6/2010 | Liao .............................. 710/240 |
| 7,752,400 | B1 * | 7/2010 | Young .......................... 711/158 |
| 2003/0140201 | A1 | 7/2003 | Takizawa |
| 2007/0079038 | A1 | 4/2007 | Lee |

FOREIGN PATENT DOCUMENTS

| JP | 2001-356961 | 12/2001 |
| JP | 2002-268942 | 9/2002 |
| JP | 2004-310394 | 11/2004 |
| JP | 2006-260472 | 9/2006 |

* cited by examiner

*Primary Examiner* — Kevin Ellis
*Assistant Examiner* — Mehdi Namazi
(74) *Attorney, Agent, or Firm* — McDermott Will & Emery LLP

(57) ABSTRACT

The memory access device includes: a plurality of command division sections provided for a plurality of masters; a plurality of inter-master arbitration sections provided for a plurality of banks; and a memory control section. Each of the command division sections divides a command issued by the corresponding master into a plurality of micro-commands when the access region of the command is over two or more banks among the plurality of banks, each of the micro-commands being a command accessing only one of the two or more banks, and gives each of the micro-commands to an inter-master arbitration section corresponding to the bank including the access region of the micro-command. Each of the inter-master arbitration sections arbitrates micro-commands given from the command division sections to select one. The memory control section selects one of a plurality of micro-commands selected by the inter-master arbitration sections to perform memory access.

11 Claims, 8 Drawing Sheets

FIG. 2

| Cycle | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 | 36 | 37 | 38 |
|---|---|---|---|---|---|---|---|---|---|---|---|---|---|---|---|---|---|---|---|---|---|---|---|---|---|---|---|---|---|---|---|---|---|---|---|---|---|---|
| Master 0 | | △Read 0000 size 16 | | | | | | | | | | | | | | | | | △Read 0020 size 16 | | | | | | | | | | | | | | | | | | | |
| Master 1 | | △Read 1000 size 32 | | | | | | | | | | | | | | | | | | | | | | | | | | | | | | | | | | | | |
| Master 2 | | △Read 2000 size 64 | | | | | | | | | | | | | | | | | | | | | | | | | | | | | | | | | | | | |
| Refresh | | △ | | | | | | | | | | | | | | | | | | | | | | | | | | | | | | | | | | | | |
| Inter-master arbitration 0 | – | 0 | 0 | 1 | 1 | 1 | 1 | 1 | 1 | 1 | 1 | 1 | 1 | 1 | 1 | 1 | 1 | 1 | 1 | 1 | 1 | 2 | 2 | 2 | 2 | 2 | 2 | 2 | 2 | 2 | 2 | 2 | 2 | 2 | – | – | – | – |
| Inter-master arbitration 1 | – | 1 | 1 | 1 | 1 | 2 | 2 | 2 | 2 | 2 | 2 | 2 | 2 | 2 | 2 | 2 | 2 | 2 | 2 | 2 | 2 | 2 | 2 | 2 | 2 | 2 | – | – | – | – | – | – | – | – | – | – | – | – |
| Inter-master arbitration 2 | – | 2 | 2 | 2 | 2 | 2 | 2 | – | – | – | – | – | – | – | – | – | – | – | – | – | – | 0 | 0 | 0 | 0 | 0 | 0 | 0 | 0 | – | – | – | – | – | – | – | – | – |
| Inter-master arbitration 3 | – | 2 | 2 | 2 | 2 | 2 | 2 | – | – | 2 | 2 | 2 | 2 | – | – | – | – | – | – | – | – | – | – | – | – | – | – | – | – | – | – | – | – | – | – | – | – | – |
| Inter-bank arbitration | – | X | – | 0 | – | 1 | – | – | – | – | 2 | – | – | 3 | – | – | – | 0 | – | – | – | 1 | – | – | – | 2 | – | – | – | 0 | – | – | – | – | – | – | – | – |
| Command | | | | A | R | A | R | | | | A | R | A | R | A | R | A | R | A | R | A | R | A | R | A | R | A | R | A | R | A | R | A | R | | | R | A |
| Bank | | | | 0 | 1 | 0 | 1 | | | | 2 | 3 | 2 | 1 | 2 | 0 | 2 | 1 | 2 | 2 | 2 | 3 | 2 | 0 | 2 | 1 | 2 | 0 | 2 | 1 | 2 | 2 | 2 | 1 | | | 2 | 0 |
| Page | | | | 0 | 0 | 1 | 0 | | | | 2 | 0 | 2 | 0 | 2 | 1 | 2 | 1 | 2 | 2 | 2 | 0 | 2 | 0 | 2 | 0 | 2 | 1 | 2 | 2 | 2 | 1 | 2 | 2 | | | 0 | 2 |

US 8,095,744 B2

DEVICE FOR CONTROLLING ACCESS FROM A PLURALITY OF MASTERS TO SHARED MEMORY COMPOSED OF A PLURALITY OF BANKS EACH HAVING A PLURALITY OF PAGES

CROSS-REFERENCE TO RELATED APPLICATIONS

This application claims priority under 35 U.S.C. §119 on Patent Application No. 2008-30108 filed in Japan on Feb. 12, 2008, the entire contents of which are hereby incorporated by reference.

BACKGROUND OF THE INVENTION

The present invention relates to a device for controlling access from a plurality of masters to a shared memory composed of a plurality of banks each having a plurality of pages, and more particularly, to a technique for enhancing the efficiency of data transfer.

Some system LSIs are known to adopt a configuration called unified memory architecture in which a plurality of masters such as a processor and a hardware engine access a shared memory. As such a memory, a synchronous dynamic random access memory (SDRAM) or the like is known. An SDRAM is composed of a plurality of banks, each of which is composed of a plurality of pages. To access an SDRAM, it is necessary to first activate a page and then issue an access command after a lapse of a fixed time. Moreover, in accessing a different page of the same bank, processing called precharge must be made for the bank to be accessed, and thereafter the bank to be accessed must be newly activated. In SDRAM access, therefore, when different pages of the same bank are accessed in succession, a page mishit may occur, degrading the access efficiency. On the other hand, access to one bank is allowed even when precharge and activation are underway for another bank. Hence, if only arrangement can be made so that different banks are accessed in succession, the SDRAM access efficiency will be enhanced. In SDRAM, also, the access efficiency degrades at the time of switching between read access and write access and the time of refresh required every fixed time period.

As methods for enhancing the SDRAM efficiency considering the natures described above, the following techniques are disclosed, for example.

In Japanese Laid-Open Patent Publication No. 2001-356961 (Patent Document 1), disclosed is a technique in which, examining information on the banks to be accessed by commands sent from a plurality of masters and on whether the access is read or write and considering the state of the SDRAM in arbitration among the masters, access is selected so that page mishits and read/write switching less occur.

In the above technique, however, a command sent from one master is limited to access to one bank. Hence, even when the master desires transfer over a plurality of bank regions, the issuance order of commands is not necessarily the order in which efficient memory access is ensured because the command issuance order is determined depending on the operation of the master.

To solve the above problem, Japanese Laid-Open Patent Publication No. 2004-310394 (Patent Document 2) discloses a technique in which commands sent from masters are accepted bank by bank and arbitration among banks is made so as to reduce page mishits.

Japanese Laid-Open Patent Publication No. 2002-268942 (Patent Document 3) discloses a technique in which when a master issues a command for access over a plurality of banks, the command is divided into micro-commands for the banks to be accessed, after arbitration among masters. The micro-commands are then put in queues for the respective banks and managed.

Japanese Laid-Open Patent Publication No. 2006-260472 (Patent Document 4) discloses a technique in which a command for access over a plurality of banks issued by a master is divided into commands for the banks, and such commands are sorted in an order in which page mishits can be reduced, to thereby improve the memory access efficiency.

Patent Documents 3 and 4 above also refer to a method of using address mapping called interleave in which banks are switched every small memory unit so that a command issued by a master is for access over a plurality of banks.

In the processing high in real-time property such as moving picture processing and the processing by a processor and the like whose latency directly affects the performance, high-speed response is required depending on the degree of emergency. Hence, in addition to enhancing the memory access efficiency, shortening the latency is also required for an access high in the degree of emergency.

In the technique disclosed in Patent Document 2, commands using the same bank are selected sequentially in arbitration among masters, and this may degrade the efficiency. The efficiency may be improved by increasing the number of accepted commands per bank. In this case, however, when an access with high priority occurs, this access must wait until the large number of commands already accepted have been processed even if high priority is given to this access in the arbitration among masters. This will increase the latency.

In the techniques disclosed in Patent Documents 3 and 4, efficient access will be attained as long as commands of masters are all for access over a plurality of banks. However, since some masters such as a processor perform random access within a small size, it is unlikely to have access over a plurality of banks for all commands.

In the technique disclosed in Patent Document 4, as a result of arbitration of accesses from a plurality of masters, such accesses may continue in succession. When such accesses are to the same bank, a page mishit may inevitably occur.

In the technique disclosed in Patent Document 3, the possibility of accepting commands free from page mishit can be increased by increasing the number of stages in the queue for each bank. In this case, however, the problem of increasing the latency of a command with high priority may occur as in Patent Document 2 above.

Also, even though the bank switching unit is made extremely small to ensure that all commands are for access over a plurality of banks, no effect will be obtained because, with such a small access unit, the access interval caused by a page mishit can not be concealed with access to another bank.

As described above, in a system having a variety of performance requirements and memory access sizes, the conventional techniques have respective problems to overcome to enhance the response performance for the processing high in the degree of emergency and the memory access efficiency.

SUMMARY OF THE INVENTION

An object of the present invention is providing a memory access device capable of performing highly efficient access while minimizing the latency for an access high in the degree of emergency in a system in which a plurality of masters access a memory in a variety of ways.

The memory access device of the present invention is a device for controlling access of a plurality of masters to a shared memory, the memory having a plurality of banks, each of the plurality of banks having a plurality of pages, the device including: a plurality of command division sections provided for the plurality of masters; a plurality of inter-master arbitration sections provided for the plurality of banks; and a memory control section, wherein each of the plurality of command division sections divides a command issued by the corresponding master into a plurality of micro-commands when an access region of the command is over two or more banks among the plurality of banks, each of the micro-commands being a command accessing only one of the two or more banks, and sends each of the micro-commands to an inter-master arbitration section corresponding to the bank including an access region of the micro-command, each of the plurality of inter-master arbitration sections arbitrates micro-commands given from the plurality of command division sections to select one of the micro-commands, and the memory control section selects one of a plurality of micro-commands selected by the plurality of inter-master arbitration sections to perform memory access.

In the memory access device described above, micro-commands are preferentially selected so that the access issuance delay that may occur from continuous access to the same page of the same bank can be reduced. Hence, efficient memory access can be attained.

Preferably, the memory access device described above further includes a priority assignment section for holding access priority information among the plurality of masters, wherein the priority assignment section notifies all of the plurality of inter-master arbitration sections of the same priority information, and each of the plurality of inter-master arbitration sections arbitrates the micro-commands according to the priority information.

In the memory access device described above, priorities can be assigned for the masters. Hence, while efficient memory access is performed, the latency of a master high in priority can be minimized.

Preferably, the memory access device described above further includes a refresh generation section for issuing a refresh request command to the memory control section, wherein the memory control section arbitrates the refresh request command and the micro-commands in arbitration of the micro-commands.

In the memory access device described above, while efficient memory access is performed, refresh can be appropriately inserted.

Preferably, the memory access device described above further includes a plurality of master priority management sections provided for the plurality of masters, wherein each of the plurality of inter-master arbitration sections selects a micro-command with reference to priority levels given from the plurality of master priority management sections in arbitration of the micro-commands.

In the memory access device described above, the wait time of each master can be controlled by controlling the priority assigned by the corresponding priority management section, such as by increasing the priority level outputted from the priority management section for each master as the wait time is longer.

Preferably, the memory access device described above further includes: a refresh generation section for issuing a refresh request command to the plurality of inter-master arbitration sections; and a refresh priority management section, wherein each of the plurality of inter-master arbitration sections arbitrates the micro-commands and the refresh request command with reference to priority levels given from the plurality of master priority management sections and a priority level given from the refresh priority management section in arbitration of the micro-commands.

In the memory access device described above, when the degree of emergency for refresh is low, high priority can be given to an access higher in priority. Hence, the latency of an access high in priority can be minimized.

Preferably, each of the plurality of inter-master arbitration sections notifies the memory control section of a priority level given from a master priority management section corresponding to a master issuing the selected micro-command, and the memory control section refers to the priority level in arbitration of micro-commands and selects a micro-command having a priority level higher than a predetermined level preferentially.

In the memory access device described above, a command high in the degree of emergency to which high priority is given over improvement of the memory use efficiency can be processed preferentially.

Preferably, the memory control section sends information on the access direction indicating whether the selected micro-command is read or write to the plurality of inter-master arbitration sections, and each of the plurality of inter-master arbitration sections selects a micro-command having the same access direction as the information on the access direction preferentially.

In the memory access device described above, not only degradation in memory use efficiency due to a page mishit but also such degradation due to read/write switching can be suppressed.

Preferably, each of the plurality of command division sections holds a plurality of access commands, and issues a micro-command prepared from an accepted access command to an inter-master arbitration section corresponding to a bank unused by an access command accepted prior to the accepted access command or a bank for which a micro-command has already been accepted by the memory control section.

In the memory access device described above, efficient memory access can be also attained among a plurality of commands issued by one master. Hence, the memory use efficiency can be further improved.

Preferably, the memory is individually refreshable by the unit of at least one bank, and the refresh generation section issues a refresh request command by the individually refreshable bank unit.

In the memory access device described above, refresh can be made for a bank that is not being accessed. Hence, degradation in memory access efficiency due to refresh can be suppressed.

According to the memory access device of the present invention, even when a memory access command issued by a master is for access over a plurality of banks, degradation in efficiency caused by a page mishit, read/write switching and refresh can be suppressed, and thus the memory access efficiency can be enhanced.

The priority can be set depending on the degree of emergency of master access and the wait time of the master, and this eliminates the necessity of queuing commands for each bank after inter-master arbitration. Hence, the latency of a master high in priority is suppressed from increasing.

With use of the memory access device high in transfer efficiency, the effective data transfer amount per unit time can be increased, and thus the processing amount of the system per unit time can be increased. For the same processing amount, therefore, the processing time and the operating frequency can be lowered, contributing to low power consumption.

The latency of the processor and the like can be suppressed from increasing, and this is contributable to improvement in response performance at the time of key input and the like, for example.

BRIEF DESCRIPTION OF THE DRAWINGS

FIG. 2 shows an example of operation of arbitration performed in Embodiment 1.

DESCRIPTION OF THE PREFERRED EMBODIMENTS

Figure 1:
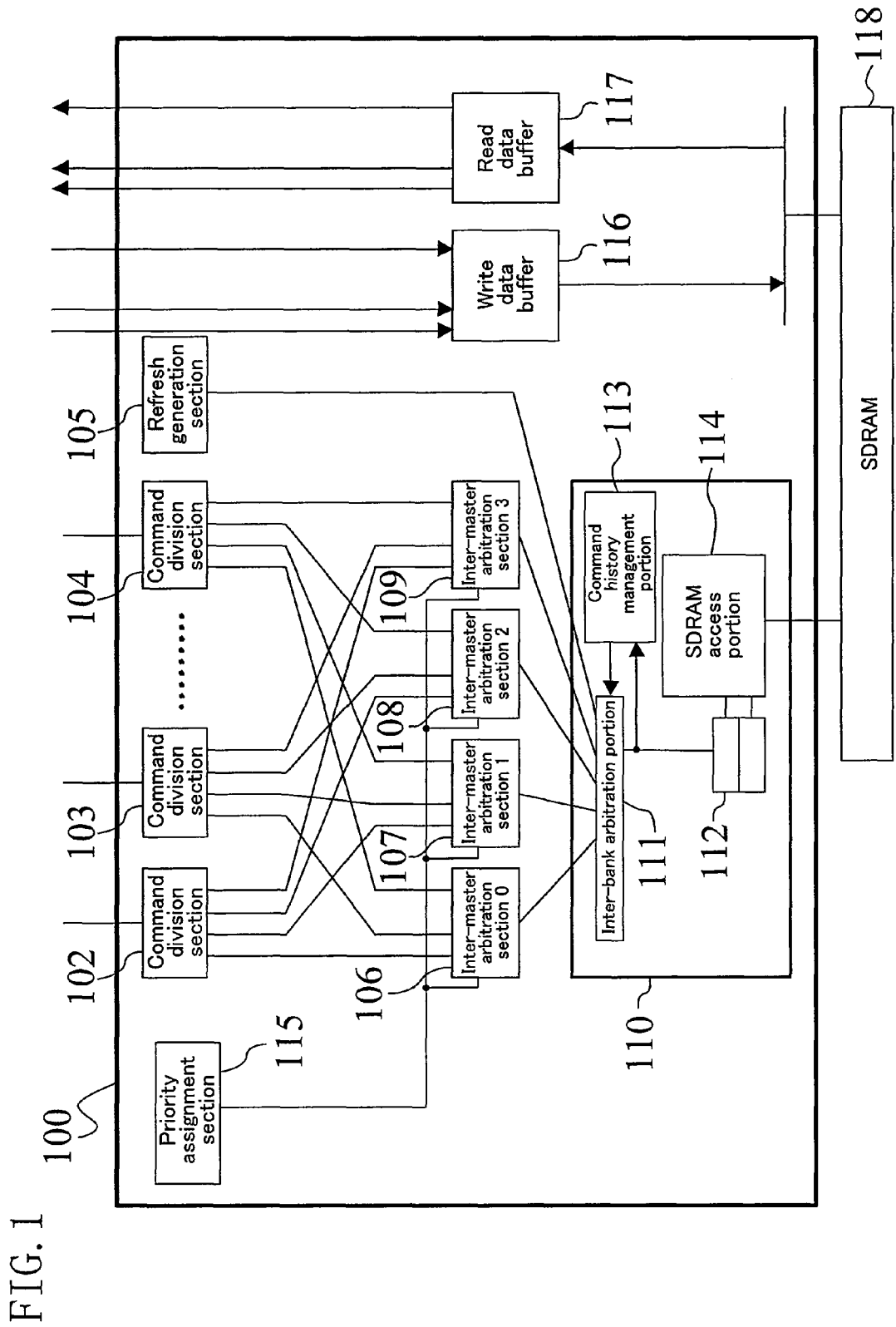
FIG. 1 is a block diagram of a memory access device of Embodiment 1 of the present invention.

Hereinafter, preferred embodiments of the present invention will be described with reference to the accompanying drawings. Note that in the drawings, substantially the same components are denoted by the same reference numerals, and description thereof is not repeated.

Embodiment 1

FIG. 1 is a block diagram of a memory access device 100 of Embodiment 1 of the present invention. The memory access device 100 includes a plurality of command division sections 102 to 104, a refresh generation section 105, a plurality of inter-master arbitration sections 106 to 109, a memory control section 110, a priority assignment section 115, a write data buffer 116 and a read data buffer 117, and is connected to an SDRAM 118 and a plurality of masters (not shown).

The plurality of command division sections 102 to 104 are provided to correspond to the plurality of masters (herein referred to as masters 0, 1 and 2). It is herein assumed that the command division sections 102, 103 and 104 respectively correspond to masters 0, 1 and 2.

The SDRAM 118 has a plurality of banks (herein referred to as banks 0, 1, 2 and 3), and each bank has a plurality of pages.

The plurality of inter-master arbitration sections 106 to 109 are provided to correspond to the plurality of banks. It is herein assumed that the inter-master arbitration sections 106, 107, 108 and 109 respectively correspond to banks 0, 1, 2 and 3.

Each of the command division sections 102 to 104 accepts a command issued by the corresponding master 0 to 2, and transmits the command to one of the inter-master arbitration sections 106 to 109 that corresponds to a bank including the access region of the command. At this time, when the command access region is over a plurality of banks in the SDRAM 118, the command division section divides the accepted command into micro-commands each of which accesses only one bank, and transmits each of such micro-commands to one of the inter-master arbitration sections 106 to 109 that corresponds to a bank including the access region of the micro-command. For example, a micro-command having an access region in bank 0 is transmitted to the inter-master arbitration section (0) 106, while a micro-command having an access region in bank 1 is transmitted to the inter-master arbitration section (1) 107. Once all of the divided micro-commands are accepted by the memory control section 110, a new command is accepted from the master. In FIG. 1, information indicating that the memory control section 110 has accepted micro-commands is sent to the command division sections 102 to 104 via the inter-master arbitration sections 106 to 109. Alternatively, the memory control section 110 may directly notify the command division sections 102 to 104 of the information.

The refresh generation section 105 issues a refresh request command for the SDRAM 118 and transmits the command to the memory control section 110 as a special micro-command.

Each of the inter-master arbitration sections 106 to 109 arbitrates micro-commands transmitted from the command division sections 102 to 104 provided master by master, selects a micro-command highest in priority according to priority information given from the priority assignment section 115, and transmits the selected micro-command to the memory control section 110.

Each of the inter-master arbitration sections 106 to 109 may change the micro-command to be transmitted to the memory control section 110 if receiving a micro-command further higher in priority than the once-arbitrated micro-command before the once-arbitrated micro-command is accepted by the memory control section 110.

The memory control section 110, including an inter-bank arbitration portion 111, a micro-command queue 112, a command history management portion 113 and an SDRAM access portion 114, arbitrates micro-commands sent from the inter-master arbitration sections 106 to 109 and the refresh generation section 105 to perform access to the SDRAM 118.

The inter-bank arbitration portion 111 determines the state of the micro-command queue 112. If there is a vacancy, the inter-bank arbitration portion 111 arbitrates micro-commands sent from the inter-master arbitration sections 106 to 109 and the refresh generation section 105 to select either one of them and puts the selected micro-command in the micro-command queue 112. In this arbitration of micro-commands, a refresh request command will be selected if existing. If no refresh request command exists, the inter-bank arbitration portion 111 refers to the command history management portion 113 and lowers the priority of a micro-command for the bank selected lately, to ensure that micro-commands for the same bank are apart from each other.

The micro-command queue 112 holds a micro-command sent from the inter-bank arbitration portion 111 and informs the SDRAM access portion 114 of information on the holding micro-command.

The SDRAM access portion 114 issues a command to the SDRAM 118 with reference to the micro-command queue 112 according to a timing protocol of the SDRAM 118. In particular, when an access command or a refresh command corresponding to the head micro-command in the micro-command queue 112 is issuable, an access command or a refresh command is issued to the SDRAM 118. When no access command or refresh command is issuable, a micro-command held in the micro-command queue 112 is noted and an active command is issued if such an active command can be issued in advance. Issuance of an active command is permitted under the conditions that no micro-command or refresh request for access to the same bank exists among micro-commands preceding the micro-command in question in the micro-command queue 112, the bank corresponding to the micro-command in question has not yet been activated and such issuance is not prohibited in the timing protocol. If there are a plurality of banks that can be activated simultaneously, an active command is issued to a bank to be accessed by a micro-command closest to the head.

The command history management portion 113 observes micro-command selected by the inter-bank arbitration portion 112, manages the bank access order and notifies the inter-bank arbitration portion 112 of the order.

The priority assignment section 115 holds priority information for access of the masters and notifies the inter-master arbitration sections 106 to 109 of the priority information. Common priority information is given to the inter-master arbitration sections 106 to 109. The priority information held in the priority assignment section 115 may be fixed for the respective masters. Otherwise, the priority assignment section 115 may be composed of a register settable with a processor and the like to permit setting by software.

The write data buffer 116 holds write data sent from a master during write access and information on the correspondence between the write data and the micro-command. In step with the timing at which the SDRAM access portion 114 makes write access to the SDRAM 118, the write data buffer 116 outputs the data corresponding to the accessing micro-command.

The read data buffer 117 holds commands issued by the masters, the order of read access commands issued to the SDRAM 118 by the SDRAM access portion 114 and read data outputted from the SDRAM 118 during read access to the SDRAM 118 by the SDRAM access portion 114. The read data buffer 117 sorts the held read data according to the command issuance order of each master and outputs the sorted data to the master.

Next, referring to FIG. 2, actual operation will be described.

In FIG. 2, the row of cycle represents the lapse of cycles synchronizing with a clock. The rows of master 0, master 1 and master 2 respectively represent the timing of commands issued by the masters and the details of the commands. The timing of issuance of a command is indicated by a triangle (Δ), and on the right of the triangle given are the details of the command including read/write, the address (in hexadecimal notation) and the access size (bytes) in this order.

It is assumed that the SDRAM 118 as the memory to be accessed adopts interleave mapping in which the four banks are switched every 16 bytes in the order of 0, 1, 2 and 3. The page size of the banks is 1024 bytes. Thus, pages are changed every 4096 bytes (1000 in hexadecimal notation).

The row of refresh represents the timing at which the refresh generation section 105 issues a refresh command, which is indicated by a triangle (Δ).

The rows of inter-master arbitration sections represent the results of arbitration of micro-commands performed by the inter-master arbitration sections 106 to 109 that receive micro-commands obtained by dividing commands of masters. Specifically, the master numbers corresponding to the selected micro-commands are shown.

It is herein assumed that the priority assignment section 115 assigns higher priorities to master 0, master 1 and master 2 in this order.

For example, in cycle 1, since the commands issued by masters 0, 1 and 2 include access to bank 0, the inter-master arbitration section (0) 106 arbitrates micro-commands sent from the command division sections 102 to 104 for the respective masters. The inter-master arbitration (0) 106 selects the micro-command from master 0 highest in priority and outputs the selected micro-command in the next cycle 2.

Thereafter, when the micro-command from the inter-master arbitration section (0) 106 is selected in cycle 4, the command division section 102 is notified of the acceptance of the micro-command of master 0. With no micro-command for bank 0 left in the command division section 102, a command from master 1 second highest in priority is arbitrated and outputted in cycle 5.

The row of inter-bank arbitration section represents the results of arbitration of micro-commands sent from the inter-master arbitration sections 106 to 109 and the refresh generation section 105, where X indicates a refresh command and the numbers indicate the numbers of the inter-master arbitration sections, that is, the banks to which the micro-commands access.

In the example shown in FIG. 2, it is assumed that as the history managed by the command history management portion 113 in the initial state, the bank accessed most lately is bank 3, followed by bank 2, bank 1 and bank 0 that is oldest in the access history.

Hence, after the selection of the refresh command highest in priority in cycle 2, the micro-commands are selected in the order of bank 0 (cycles 4, 22), bank 1 (cycles 6, 26), bank 2 (cycles 14, 30) and bank 3 (cycle 18) as the oldest bank in the history. Note that although bank 3 is the oldest in the history in cycle 34, a micro-command for bank 0 second highest in priority is selected because no micro-command exists for bank 3.

In the example shown in FIG. 2, also, it is assumed that the inter-bank arbitration portion 111 does not perform arbitration in a cycle next to any cycle in which arbitration has been executed. No arbitration results are therefore shown in cycles such as 3, 5 and 7.

Also, since the command queue 112 has two stages, next arbitration is not performed as long as two micro-commands are in the command queue 112 as in cycle 8, but has to wait until a read access command is issued to give a vacancy as in cycle 14.

The bottom rows of command, bank and page represent details of commands for access to the SDRAM 118 issued by the SDRAM access portion 114, where X represents a refresh command, A represents an active command and R represents a read command.

In the example of operation in FIG. 2, it is assumed that the SDRAM 118 has such a protocol that the interval from a refresh command to an active command is 7 cycles, the interval from an active command to an active command for another bank is 2 cycles, the interval from an active command to a read command is 3 cycles, and the interval from a read command to a next active command is 9 cycles.

In SDRAM, precharge is necessary to issue a next active command after read access. In the illustrated example, however, a function of auto-precharge where precharge is made automatically after read access is used, and thus no precharge command is issued.

The data bus width of the SDRAM 118 is 4 bytes. Therefore, it takes 4 cycles to access 16 bytes of each bank, and thus, 4 cycles are necessary as the read access interval between different banks.

As a result, it is found from the string of commands accessing the SDRAN 118 that commands from master 0, master 1 and master 2 efficiently access the memory while changing the banks on the micro-command to micro-command basis.

Note that the type of the memory (SDRAM 118), the timing protocol, the mapping of addresses to banks and pages and the like adopted in this embodiment are merely illustrative and by no means restrict the scope of applications of the present invention.

The setting in this embodiment that the output from each of the inter-master arbitration sections 106 to 109, the output from the inter-bank arbitration section 111 and the output of a command to the SDRAM 118 are shifted by one cycle and that the arbitration by the inter-bank arbitration portion 111 is made every other cycle can be determined from the circuit design requirements such as the clock frequency, and thus by no means restricts the scope of the present invention.

In this embodiment, simple one-dimensional region access commands are handled as access commands of masters. Two-dimensional rectangular region access commands can also be handled in a similar manner by considering accesses to the same page of the same bank as one micro-command collectively.

In the case of dividing a two-dimensional rectangular region access command to prepare a plurality of micro-commands for the same page of the same bank, information indicating succession of accesses to the same page may be attached to the micro-commands. For the same page access, therefore, commands of the same master for the same bank can be processed in succession, and thus can be handled in a manner similar to the case that they are prepared as one micro-command, in the inter-master arbitration sections 106 to 109 and the inter-bank arbitration portion 111.

It should be noted that the configuration of the memory control section 110 in this embodiment is merely illustrative. The selection rule of the inter-bank arbitration portion 111 and the way of determining a command to be accessed to the memory (SDRAM 118) should by no means restrict the scope of the present invention. For example, although the bank access order is stored as the access history in this embodiment, simple round-robin arbitration of simply storing the immediately preceding bank may be adopted.

As described above, in Embodiment 1, if a command for access over a plurality of banks is found among commands issued by a master, the order of micro-commands within one master and the order of commands among masters may be sorted, to attain efficient SDRAM access.

Also, since the buffer amount necessary at and after the inter-bank arbitration portion 111 can be minimized, the latency of access of a master high in priority can be shortened.

Embodiment 2

Figure 3:
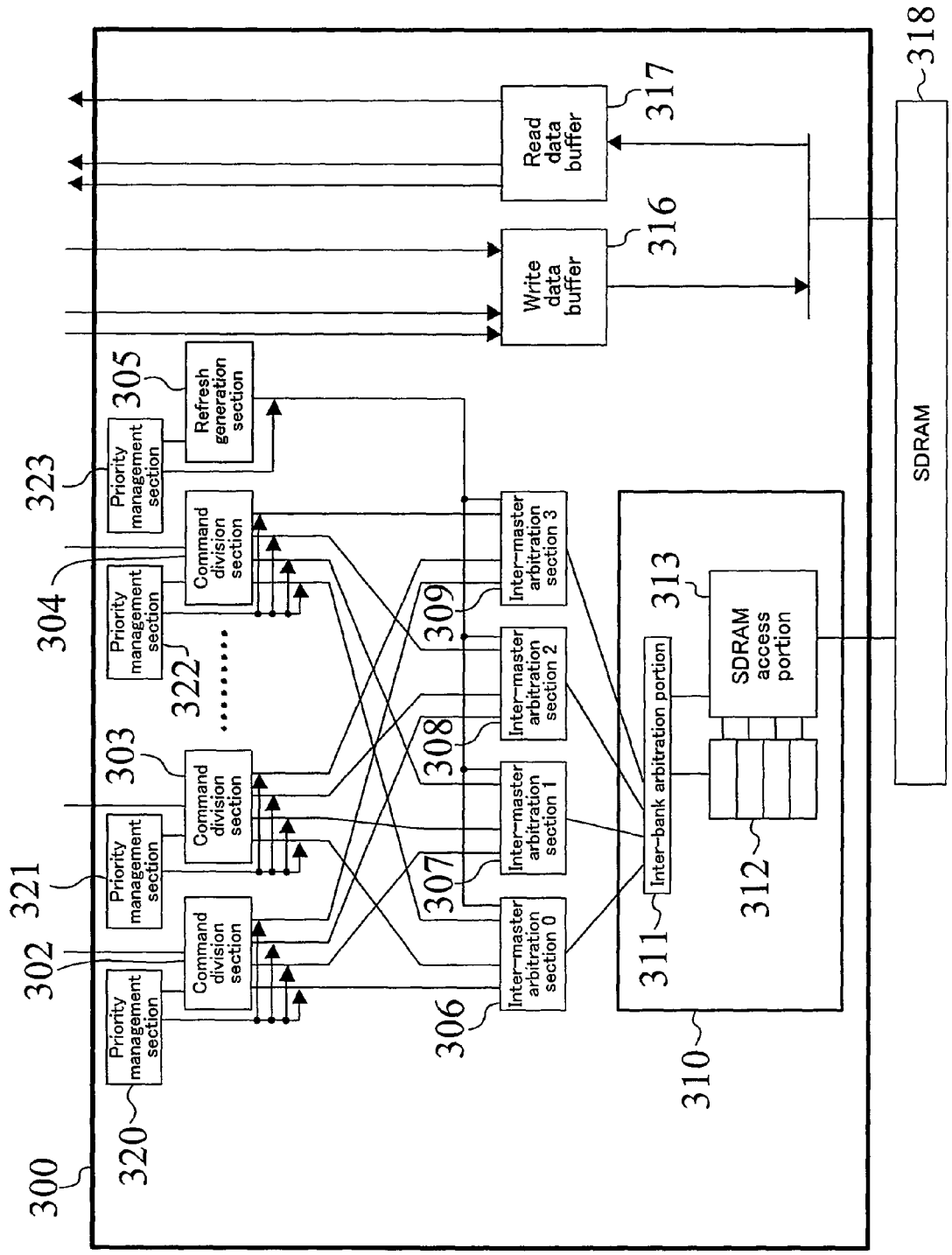
FIG. 3 is a block diagram of a memory access device of Embodiment 2 of the present invention.

FIG. 3 is a block diagram of a memory access device 200 of Embodiment 2. The memory access device 200 includes a plurality of command division sections 302 to 304, a refresh generation section 305, a plurality of inter-master arbitration sections 306 to 309, a memory control section 310, a write data buffer 316, a read data buffer 317 and a plurality of priority management sections 320 to 323, and is connected to an SDRAM 318 and a plurality of masters (not shown).

The plurality of command division sections 302 to 304 are provided to correspond to the plurality of masters (herein referred to as masters 0, 1 and 2). It is herein assumed that the command division sections 302, 303 and 304 respectively correspond to masters 0, 1 and 2.

The SDRAM 318 has a plurality of banks (herein referred to as banks 0, 1, 2 and 3), and each bank has a plurality of pages.

The plurality of inter-master arbitration sections 306 to 309 are provided to correspond to the plurality of banks 0 to 3. It is herein assumed that the inter-master arbitration sections 306, 307, 308 and 309 respectively correspond to banks 0, 1, 2 and 3.

The priority management sections 320 to 322 are provided to correspond to the plurality of masters (masters 0, 1 and 2).

It is herein assumed that the priority management sections 320, 321 and 322 respectively correspond to masters 0, 1 and 2. The priority management section 323 is provided to correspond to the refresh generation section 305.

Each of the command division sections 302 to 304 accepts a command issued by the corresponding master 0 to 2, and transmits the command to one of the inter-master arbitration sections 306 to 309 that corresponds to a bank including the access region of the command. At this time, when the command access region is over a plurality of banks in the SDRAM 318, each of the command division sections 302 to 304 divides the command into micro-commands each of which accesses only one bank, and transmits each of such micro-commands to one of the inter-master arbitration sections 306 to 309 that corresponds to a bank including the access region of the micro-command.

The refresh generation section 305 issues a refresh request command to the SDRAM 318 and transmits the command to all the inter-master arbitration sections 306 to 309 as a special micro-command.

Each of the priority management sections 320 to 322 is composed of a counter register. Once receiving a request from the corresponding master, the priority management section counts down every cycle with the counter until all the divided micro-commands are accepted by the memory control section 310. A smaller counter value indicates higher priority. That is, as the wait time is longer, the priority becomes higher. Once all the micro-commands have been accepted by the memory control section 310, the counter register value may be reset to the initial value, or a set value may be added to count down to the initial value even when no request is made from the master. In the former case, the latency for each request can be made about the same at any time. In the latter case, the priority can be lowered for a command requested at intervals shorter than a controlled interval by use of the set added value, to thereby give higher priority to access of another master. The counter register values are transmitted to the inter-master arbitration sections 306 to 309 simultaneously with micro-commands sent from the command division sections 302 to 304.

The priority management section 323 for refresh is the same as the priority management sections 320 to 322 for masters except that the countdown is started at the time of issuance of a refresh request by the refresh generation section 305, in place of acceptance of a command from a master.

Each of the inter-master arbitration sections 306 to 309 arbitrates micro-commands transmitted from the command division sections 302 to 304 provided master by master and a refresh command transmitted from the refresh generation section 305, and transmits the result to the memory control section 310.

In arbitration of micro-commands, each of the inter-master arbitration sections 306 to 309 refers to the counter register values from the priority management sections 320 to 323 transmitted simultaneously with the micro-commands and selects a micro-command whose corresponding counter register value is smallest. In the transmission of the selected micro-command to the memory control section 310, the inter-master arbitration section also transmits the counter register value received simultaneously with the selected micro-command.

Each of the inter-master arbitration sections 306 to 309 may change the micro-command to be transmitted to the memory control section 310 if a micro-command having priority further higher than the once-arbitrated micro-command is sent before the once-arbitrated micro-command is accepted by the memory control section 310.

The counter register values in the priority management sections 320 to 323 are updated every cycle, and thus the counter register values transmitted to the memory control section 310 are also updated every cycle.

The memory control section 310, including an inter-bank arbitration portion 311, a micro-command queue 312 and an SDRAM access portion 313, arbitrates micro-commands sent from the inter-master arbitration sections 306 to 309 to perform access to the SDRAM 318.

The inter-bank arbitration portion 311 arbitrates micro-commands sent from the inter-master arbitration sections 306 to 309 based on the state of the micro-command queue 312 and memory state information sent from the SDRAM access portion 313. In this relation, a priority counter value to which high priority should be given over the access efficiency is set in advance in the inter-bank arbitration portion 311. In arbitration, the inter-bank arbitration portion 311 refers to the priority counter values of the commands and the set value.

Figure 4:
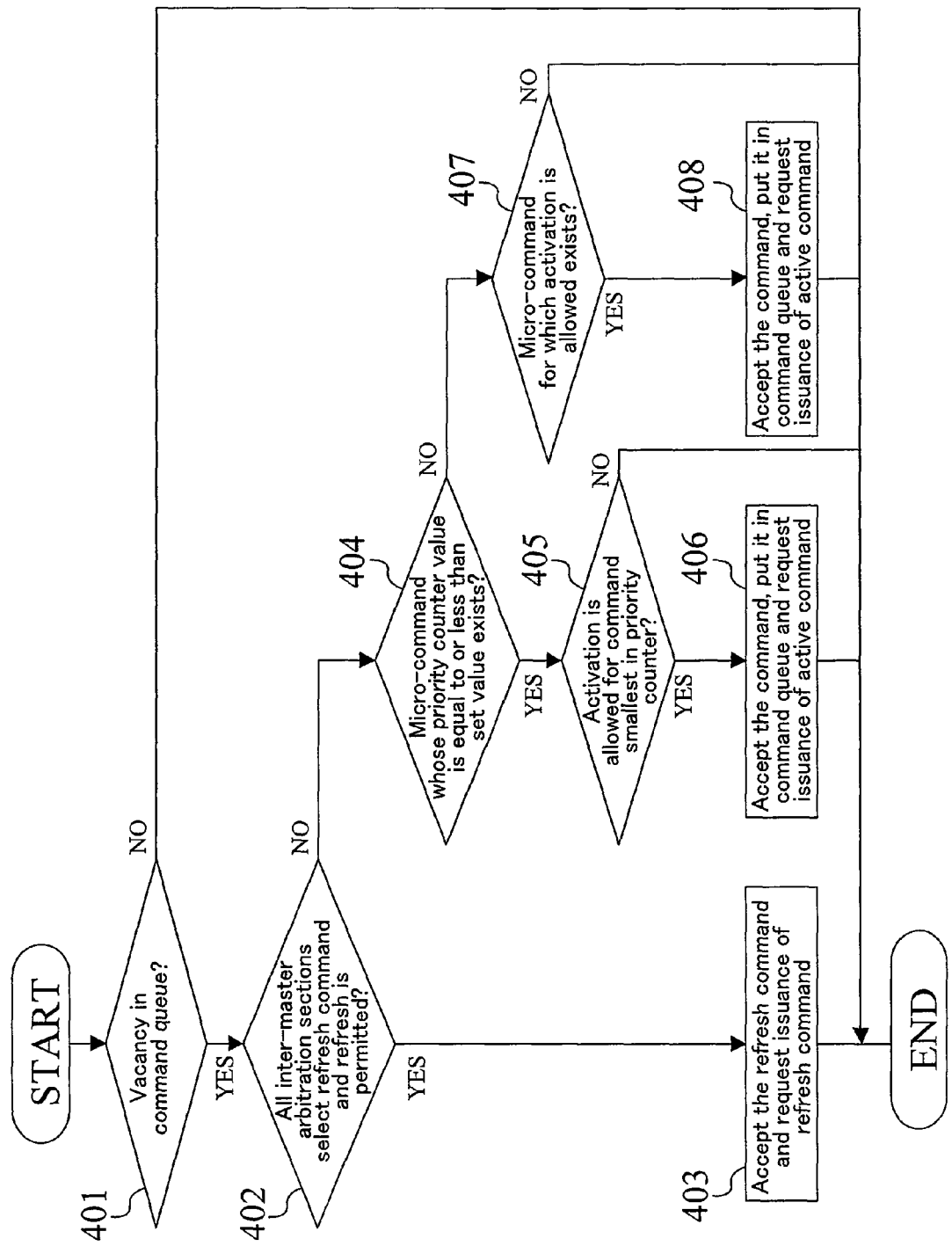
FIG. 4 shows an operation flow of an inter-bank arbitration portion in Embodiment 2.

FIG. 4 shows an operation flow of one cycle of arbitration processing performed by the inter-bank arbitration portion 311.

In step 401, the inter-bank arbitration portion 311 checks the vacancy state of the micro-command queue 312, and the process proceeds to step S402 if there is a vacancy or completes the processing if there is no vacancy.

In step 402, the inter-bank arbitration portion 311 examines micro-commands sent from the inter-master arbitration sections 306 to 309, and the process proceeds to step 403 if the micro-commands are all refresh requests and a refresh command is issuable. In step 403, the inter-bank arbitration portion 311 accepts all the refresh requests from the inter-master arbitration sections 306 to 309 and sends a refresh command issuance request to the SDRAM access portion 313.

If a micro-command other than a refresh request exists or if issuance of a refresh command is not permitted in step 402, the process proceeds to step 404 to determine whether or not there is a micro-command, other than a refresh request, whose priority counter value is equal to or less than the set value.

If there is a micro-command whose priority counter value is equal to or less than the set value, the process proceeds to step 405 to determine whether or not an active command is issuable for a bank used by a micro-command having the smallest priority counter value. If issuable, the process proceeds to step 406 to accept the micro-command in question, puts the micro-command in the micro-command queue 312 and sends an active command issuance request to the SDRAM access portion 313.

When there are a plurality of micro-commands having the smallest priority counter value in step 405, a micro-command using a bank for which an active command is issuable is selected preferentially.

If an active command is not issuable in step 405, the processing is completed.

If there is no micro-command whose priority counter value is equal or less than the set value in step 404, the process proceeds to step 407 to determine whether or not there is a micro-command using a bank for which an active command is issuable. If there is, the process proceeds to step 408 to accept the micro-command in question, puts the micro-command in the micro-command queue 312 and sends an active command issuance request to the SDRAM access portion 313.

If there is no micro-command permitting issuance of an active command, the processing is completed.

In steps 406 and 408, when there are a plurality of micro-commands that apply, selection is made according to the round-robin arbitration theory to avoid one-sided selection of micro-commands for access to a specific bank.

The set value in step 404 may be a fixed value or a register value settable with a processor.

The micro-command queue 312 holds micro-commands sent from the inter-bank arbitration portion 311 and informs the SDRAM access portion 313 of information on the holding micro-commands.

The SDRAM access portion 313 issues an access command to the SDRAM 318 with reference to the micro-command queue 312 based on the timing protocol of the SDRAM 318.

When no issuable access command exists, the SDRAM access portion 313 asks the inter-bank arbitration portion 311 whether or not a refresh command is issuable and also notifies the inter-bank arbitration portion 311 of a bank for which an active command is issuable. The SDRAM access portion 313 issues a refresh command to the SDRAM 318 when receiving a refresh command issuance request from the inter-bank arbitration portion 311, and issues an active command for the bank to the SDRAM 318 when receiving an active command issuance request. The bank for which an active command is issuable refers to a bank for which an active command is issuable according to the timing protocol of the SDRAM 318 except for a bank to which a micro-command in the micro-command queue 312 is to access.

The write data buffer 316 holds write data sent from a master during write access and information on the correspondence between the write data and a micro-command. In step with the timing of write access to the SDRAM 318 by the SDRAM access portion 314, the write data buffer 316 outputs the write data corresponding to the accessing micro-command.

The read data buffer 317 holds commands issued by the masters, the order of read access commands issued to the SDRAM 318 by the SDRAM access portion 313 and read data outputted from the SDRAM 318 during read access to the SDRAM 318 by the SDRAM access portion 313. The read data buffer 117 sorts the held read data according to the command issuance order of each master and outputs the sorted data to the master.

Thus, in Embodiment 2, the priority management sections 320 to 323 are provided for the respective masters and the refresh. This permits efficient SDRAM access including refresh while preventing a low-priority master from having to wait for access for an extremely long time.

Also, since the priority information outputted from the priority management sections 320 to 323 is transmitted to as far as the memory control section 310 via the inter-master arbitration sections 306 to 309, high priority can be given to an access high in the degree of emergency. Hence, while efficient SDRAM access is attained, the processing high in real-time property can be guaranteed.

The memory control section 310 may be in a variety of configurations, and the configuration of the memory control section 310 in this embodiment should by no means restrict the scope of the present invention.

For example, in the memory control section 310 in this embodiment, a micro-command for which an active command has been issued is accepted in the queue 312. Alternatively, the memory control section 310 may send a signal to one of the inter-master arbitration sections 306 to 309 that has sent a micro-command for which an active command has been issued, to instruct the inter-master arbitration section in question to continue sending the same micro-command until memory access is permitted. Once memory access is permitted, the memory control section 310 may accept the micro-command and simultaneously perform memory access. Otherwise, the memory control section 310 may have the same configuration as that in Embodiment 1.

In this embodiment, the priority management sections 320 to 323 were provided for all masters and refresh, and had respective counters indicating the priority level. It is however needless to mention that a fixed priority level may be given to some master or masters.

Embodiment 3

Figure 5:
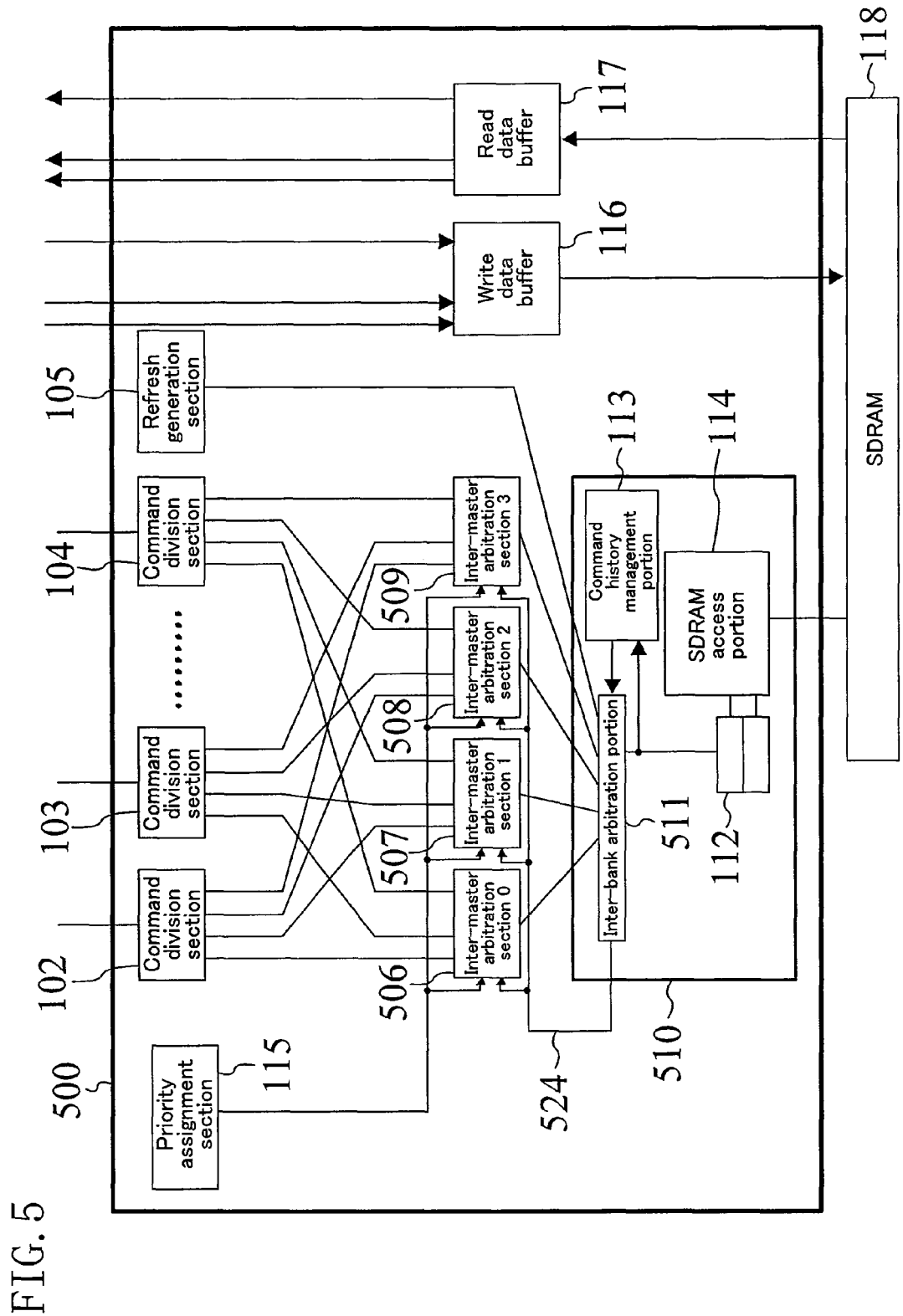
FIG. 5 is a block diagram of a memory access device of Embodiment 3 of the present invention.

FIG. 5 is a block diagram of a memory access device 500 of Embodiment 3. The memory access device 500 includes a plurality of command division sections 102 to 104, a refresh generation section 105, a plurality of inter-master arbitration sections 506 to 509, a memory control section 510, a priority assignment section 115, a write data buffer 116 and a read data buffer 117, and is connected to an SDRAM 118 and a plurality of masters (not shown). In FIG. 5, the command division sections 102 to 104, the refresh generation section 105, the priority assignment section 115, the write data buffer 116 and the read data buffer 117 have functions equivalent to those of the counterparts in Embodiment 1 (FIG. 1), and thus description of these components is omitted here.

The memory control section 510 includes an inter-bank arbitration portion 511, a micro-command queue 112, a command history management portion 113 and an SDRAM access portion 114. The micro-command queue 112, the command history management portion 113 and the SDRAM access portion 114 have functions equivalent to those of the counterparts in Embodiment 1 (FIG. 1), and thus description of these components is omitted here.

In Embodiment 3, the inter-bank arbitration portion 511 selects a micro-command as does the inter-bank arbitration portion 111 in Embodiment 1 (FIG. 1), and in addition to this, notifies the inter-master arbitration sections 506 to 509 of information on whether the selected micro-command is read, write or refresh via a signal line 524.

Referring to the read/write information obtained via the signal line 524, each of the inter-master arbitration sections 506 to 509 preferentially selects a micro-command highest in priority level among read micro-commands if the micro-command accepted last time by the inter-bank arbitration portion 511 is a read micro-command, or selects a micro-command highest in priority level among write micro-commands if it is a write micro-command. When no such micro-command exists or when the last-accepted micro-command is a refresh command, a micro-command highest in priority level among all micro-commands is selected.

As described above, in Embodiment 3, by notifying the inter-master arbitration sections 506 to 509 of the read/write information of a micro-command accepted by the memory control section 510, the frequency of read/write switching can be reduced, and thus further efficient memory access can be attained.

In this embodiment, high priority is simply given to a command identical in the access direction. Alternatively, as for commands having a priority level equal to or higher than a given level, a command high in priority level may be selected irrespective of the access direction.

Embodiment 4

Figure 6:
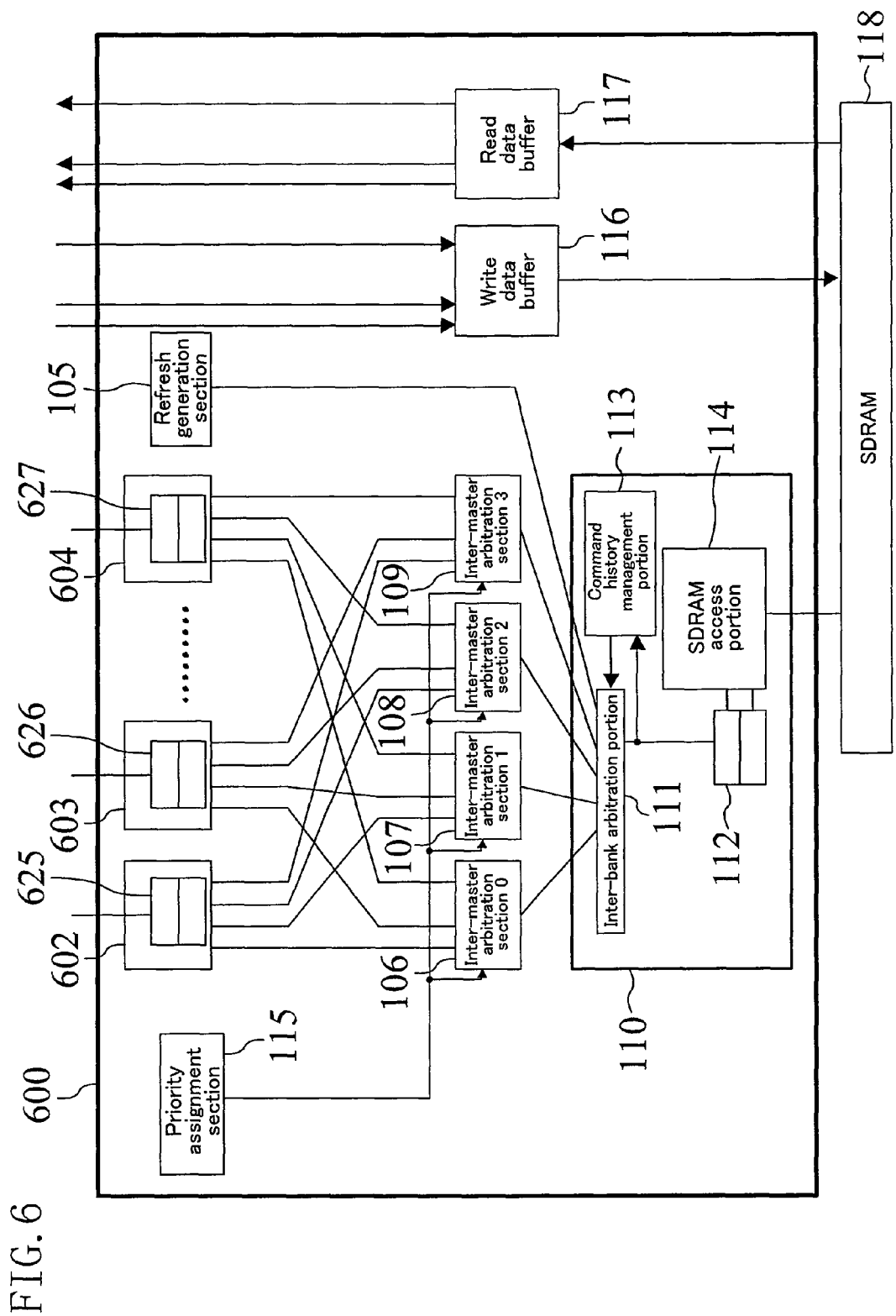
FIG. 6 is a block diagram of a memory access device of Embodiment 4 of the present invention.

FIG. 6 is a block diagram of a memory access device 600 of Embodiment 4. The memory access device 600 includes a plurality of command division sections 602 to 604, a refresh generation section 105, a plurality of inter-master arbitration sections 106 to 109, a memory control section 110, a priority assignment section 115, a write data buffer 116 and a read data buffer 117, and is connected to an SDRAM 118 and a plurality of masters (not shown). In FIG. 6, the refresh generation section 105, the inter-master arbitration sections 106 to 109, the priority assignment section 115, the write data buffer 116 and the read data buffer 117 have functions equivalent to those of the counterparts in Embodiment 1 (FIG. 1), and thus description of these components is omitted here.

Each of the command division sections 602 to 604 accepts a command issued by the corresponding master 0 to 2, and transmits the command to one of the inter-master arbitration sections 106 to 109 that corresponds to a bank including the access region of the command. At this time, when the command access region is over a plurality of banks in the SDRAM 118, each of the command division sections 602 to 604 divides the command to micro-commands each of which accesses only one bank, and transmits each of such micro-commands to one of the inter-master arbitration sections 106 to 109 that corresponds to a bank including the access region of the micro-command.

The command division sections 602 to 604 are respectively provided with 2-stage command queues 625 to 627 to allow acceptance of two access commands sent from the corresponding masters.

In each of the command division sections 602 to 604, when there is a bank that has not been accessed by a previously-accepted command, or when part of divided micro-commands has been accepted by the memory control section 110, the command division section is in a state of having transmitted no micro-command to some of the inter-master arbitration sections 106 to 109.

In the above state, if a second command put in the corresponding command queue 625 to 627 is to access the bank in question, a micro-command prepared by dividing the second command will be transmitted to the inter-master arbitration section for the bank in question.

As a result, a micro-command prepared from the first command and a micro-command prepared from the second command will be transmitted simultaneously: the latter micro-command may possibly be accepted earlier by the memory control section 110. Even in this case, however, the order of accesses to the same address will not be changed because accesses to the same address are for the same bank.

Each of commands put in the command queues 625 to 627 is removed from the command queue at the time when all micro-commands prepared by dividing the command have been accepted by the memory control section 110, and a new command is put in the queue from the master.

As described above, in Embodiment 4, since a plurality of commands are accepted at a time by each of the command division sections 602 to 604, the order of processing of commands from the same master can be changed on a micro-command to micro-command basis. This permits further efficient SDRAM access.

In this embodiment, in the command division sections 602 to 604, commands sent from the masters were put in the queues. Alternatively, after commands are divided into micro-commands, such micro-commands may be put in queues provided for the respective banks to be accessed.

In this embodiment, the number of commands acceptable by each of the command division sections 602 to 604 was two. It is needless to mention that the queue can be configured to accept three or more commands.

In this embodiment, the command division sections 602 to 604 in the memory access device 600 divide commands into micro-commands. Alternatively, each master may perform division into micro-commands, and each of the command division sections 602 to 604 in the memory access device 600 may not perform division but have a queue for micro-commands to perform only the processing of transmitting the micro-commands to the inter-master arbitration sections 106 to 109.

Embodiment 5

Figure 7:
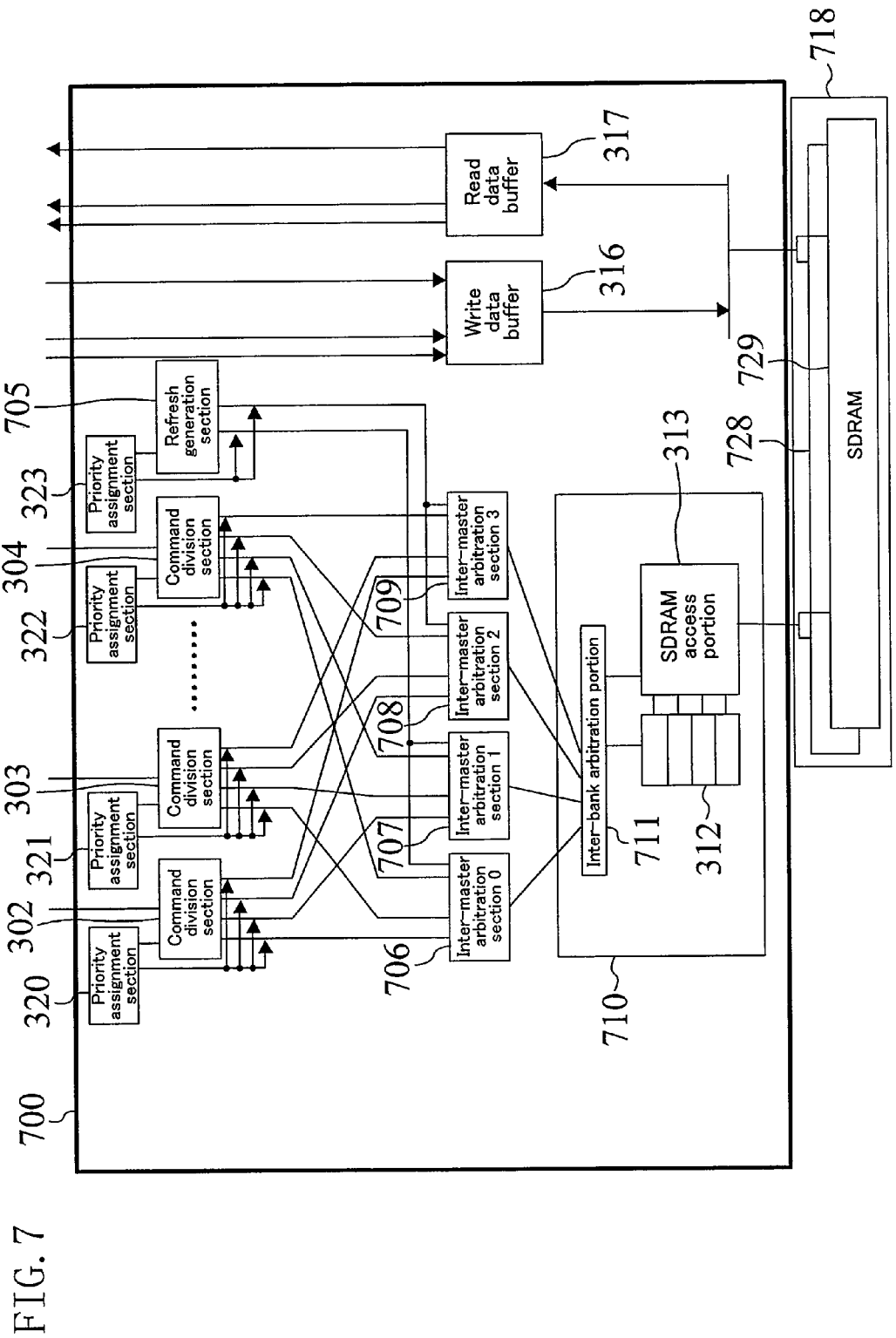
FIG. 7 is a block diagram of a memory access device of Embodiment 5 of the present invention.

FIG. 7 is a block diagram of a memory access device 700 of Embodiment 5. The memory access device 700 includes a plurality of command division sections 302 to 304, a refresh generation section 705, a plurality of inter-master arbitration sections 706 to 709, a memory control section 710, a write data buffer 316, a read data buffer 317 and a plurality of priority management sections 320 to 323, and is connected to an SDRAM 718 and a plurality of masters (not shown).

The components in FIG. 7 have roughly the same functions as the counterparts in Embodiment 2 (FIG. 3), and thus detailed description is omitted and only points different in operation and configuration will be described.

The SDRAM 718 is composed of two SDRAMs 728 and 729 each composed of two banks. Which one of the SDRAMs a command is to access from the memory control section 710 is recognized by additionally transmitting a signal indicating whether the command is valid or invalid for the respective SDRAMs at the time of output of the command. Other command information and the signal lines for input/output of data are shared. The SDRAMs 728 and 729 can be refreshed separately although the two banks of each SDRAM cannot be refreshed separately.

The inter-master arbitration sections 706 to 709 correspond to the banks of the SDRAMs: the inter-master arbitration sections 706 and 707 respectively correspond to banks 0 and 1 of the SDRAM 728 and the inter-master arbitration sections 708 and 709 respectively correspond to banks 0 and 1 of the SDRAM 729.

The refresh generation section 705 distinguishes refresh request commands for the SDRAM 728 from refresh request commands for the SDRAM 729. Refresh request commands for the SDRAM 728 are transmitted to the inter-master arbitration sections 706 and 707, while refresh request commands for the SDRAM 729 are transmitted to the inter-master arbitration sections 708 and 709.

The inter-bank arbitration portion 711 follows the flowchart of FIG. 4 as in Embodiment 2, except for the processing of step 402.

In Embodiment 5, in step 402, the process proceeds to step 403 if both the two inter-master arbitration sections corresponding to the SDRAM 728 or 729 select a refresh command and refresh of the SDRAM is permitted, and the inter-bank arbitration portion 711 requests the SDRAM access portion 313 to issue a refresh command to the SDRAM in question.

If both the SDRAMs 728 and 729 satisfy the condition, refresh commands will be issued to both SDRAMs.

In this embodiment, the configuration of two SDRAMs each having two banks was described. It is however evident that the bank configuration and the number of SDRAMs are not limited to these and that the present invention is also applicable to a memory having banks refreshable independently.

As described above, in Embodiment 5, memory access and refresh can be efficiently arbitrated, and this can enhance the memory access efficiency.

Embodiment 6

Figure 8:
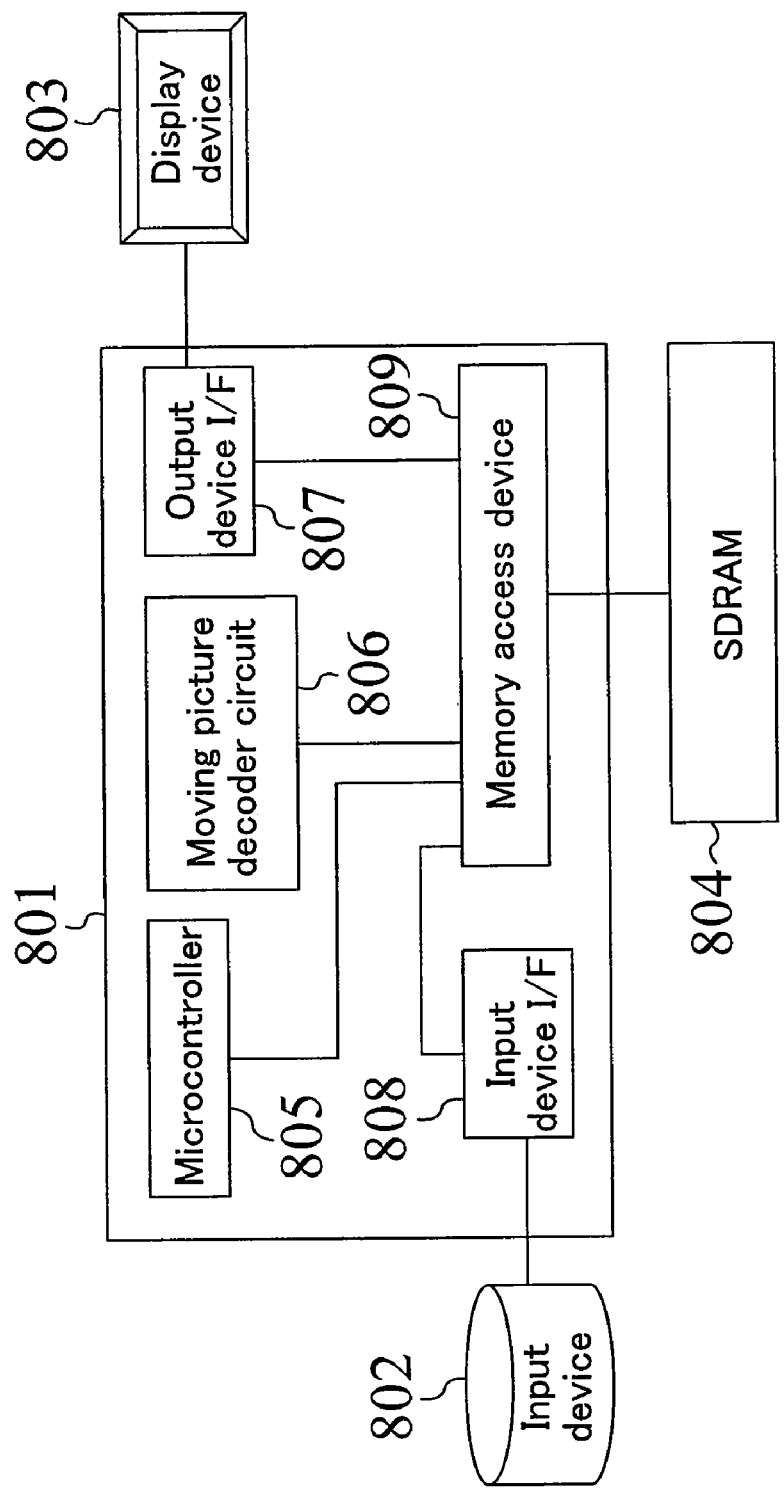
FIG. 8 is a block diagram of a system of Embodiment 6 of the present invention.

FIG. 8 is a view illustrating a system of Embodiment 6. The system of FIG. 8 includes an input device 802 such as a DVD drive, a display device 803 such as an LCD, an SDRAM 804 and a system LSI 801.

The system LSI 801 includes an input device interface circuit 808, an output device interface circuit 807, a microcontroller circuit 805, a moving picture decoder circuit 806 and a memory access device circuit 809 as any of the memory access devices of Embodiments 1 to 5. The input device interface circuit 808, the output device interface circuit 807, the microcontroller circuit 805 and the moving picture decoder circuit 806 are connected to the memory access device circuit 809.

Although not shown, the microcontroller circuit 805 is connected to the input device interface circuit 808, the output device interface circuit 807 and the moving picture decoder circuit 806, to enable control of these circuits.

The input device interface circuit 808 is connected to the input device 802, the output device interface circuit 807 is connected to the display device 803, and the memory access device circuit 809 is connected to the SDRAM 804.

In the system of FIG. 8, the microcontroller 805 reads and executes a program stored in the SDRAM 804 to control the input device interface circuit 808, the output device interface circuit 807 and the moving picture decoder circuit 806. Under this control, the input device interface circuit 808 reads moving picture stream data from the input device 802 into the SDRAM 804, the moving picture decoder circuit 806 decodes the moving picture stream data stored in the SDRAM 804 to prepare image data and writes the image data in the SDRAM 804, and the output device interface circuit 807 reads the image data from the SDRAM 803 to display the data on the display device 803.

During the above operation, the input device interface circuit 808, the output device interface circuit 807, the microcontroller circuit 805 and the moving picture decoder circuit 806 access the SDRAM 804 via the memory access device circuit 809. Efficient SDRAM access can therefore be attained.

As described above, in Embodiment 6, a plurality of masters can access the SDRAM efficiently, and thus the system performance can be enhanced.

The SDRAM was used as the memory in Embodiments 1 to 6. It is needless to mention that the present invention is also applicable to memories having similar natures such as double data rate SDRAM and Rambus DRAM.

While the present invention has been described in preferred embodiments, it will be apparent to those skilled in the art that the disclosed invention may be modified in numerous ways and may assume many embodiments other than those specifically set out and described above. Accordingly, it is intended by the appended claims to cover all modifications of the invention which fall within the true spirit and scope of the invention.

What is claimed is:

1. A memory access device for controlling access of a plurality of masters to a shared memory, the shared memory having a plurality of banks, each of the plurality of banks having a plurality of pages, the device comprising:
a plurality of command division sections provided for the plurality of masters;
a plurality of inter-master arbitration sections provided for the plurality of banks; and
a memory control section, wherein each of the plurality of command division sections divides a command issued by the corresponding master into a plurality of micro-commands when an access region of the command is over two or more banks among the plurality of banks, each of the plurality of micro-commands being a command accessing only one of the two or more banks, and sends each of the micro-commands to an inter-master arbitration section corresponding to the bank including an access region of the micro-command, each of the plurality of inter-master arbitration sections arbitrates micro-commands given from the plurality of command division sections to select one of the micro-commands, and the memory control section selects one of the plurality of micro-commands selected by the plurality of inter-master arbitration sections to perform memory access.

2. The device of claim 1, further comprising a priority assignment section for holding access priority information among the plurality of masters, wherein the priority assignment section notifies all of the plurality of inter-master arbitration sections of the same priority information, and each of the plurality of inter-master arbitration sections arbitrates the plurality of micro-commands according to the priority information.

3. The device of claim 1, further comprising a refresh generation section for issuing a refresh request command to the memory control section, wherein the memory control section arbitrates the refresh request command and the micro-commands in arbitration of the plurality of micro-commands.

4. The device of claim 1, further comprising a plurality of master priority management sections provided for the plurality of masters, wherein each of the plurality of inter-master arbitration sections selects a micro-command with reference to priority levels given from the plurality of master priority management sections in arbitration of the plurality of micro-commands.

5. The device of claim 4, further comprising:

a refresh generation section for issuing a refresh request command to the plurality of inter-master arbitration sections; and a refresh priority management section, wherein each of the plurality of inter-master arbitration sections arbitrates the plurality of micro-commands and the refresh request command with reference to priority levels given from the plurality of master priority management sections and a priority level given from the refresh priority management section in arbitration of the plurality of micro-commands.

6. The device of claim 4, wherein each of the plurality of inter-master arbitration sections notifies the memory control section of a priority level given from a master priority management section corresponding to a master issuing the selected micro-command, and the memory control section refers to the priority level in arbitration of the plurality of micro-commands and selects a micro-command having a priority level higher than a predetermined level preferentially.

7. The device of claim 1, wherein the memory control section sends information on the access direction indicating whether the selected micro-command is read or write to the plurality of inter-master arbitration sections, and each of the plurality of inter-master arbitration sections selects a micro-command having the same access direction as the information on the access direction preferentially.

8. The device of claim 1, wherein each of the plurality of command division sections holds a plurality of access commands, and issues a micro-command prepared from an accepted access command to an inter-master arbitration section corresponding to a bank unused by an access command accepted prior to the accepted access command or a bank for which a micro-command has already been accepted by the memory control section.

9. The device of claim 3, wherein the shared memory is individually refreshable by the unit of at least one bank, and the refresh generation section issues a refresh request command by the individually refreshable bank unit.

10. The device of claim 5, wherein the memory is individually refreshable by the unit of at least one bank, and the refresh generation section issues a refresh request command by the individually refreshable bank unit.

11. A system comprising:

a system LSI including a plurality of masters and the memory access device of claim 1; and a memory composed of a plurality of banks, the memory being connected to the system LSI, wherein the memory access device arbitrates access from the masters to the banks of the memory.

* * * * *